June 14, 1966  J. H. KIRKPATRICK, JR  3,255,831
HARROWS

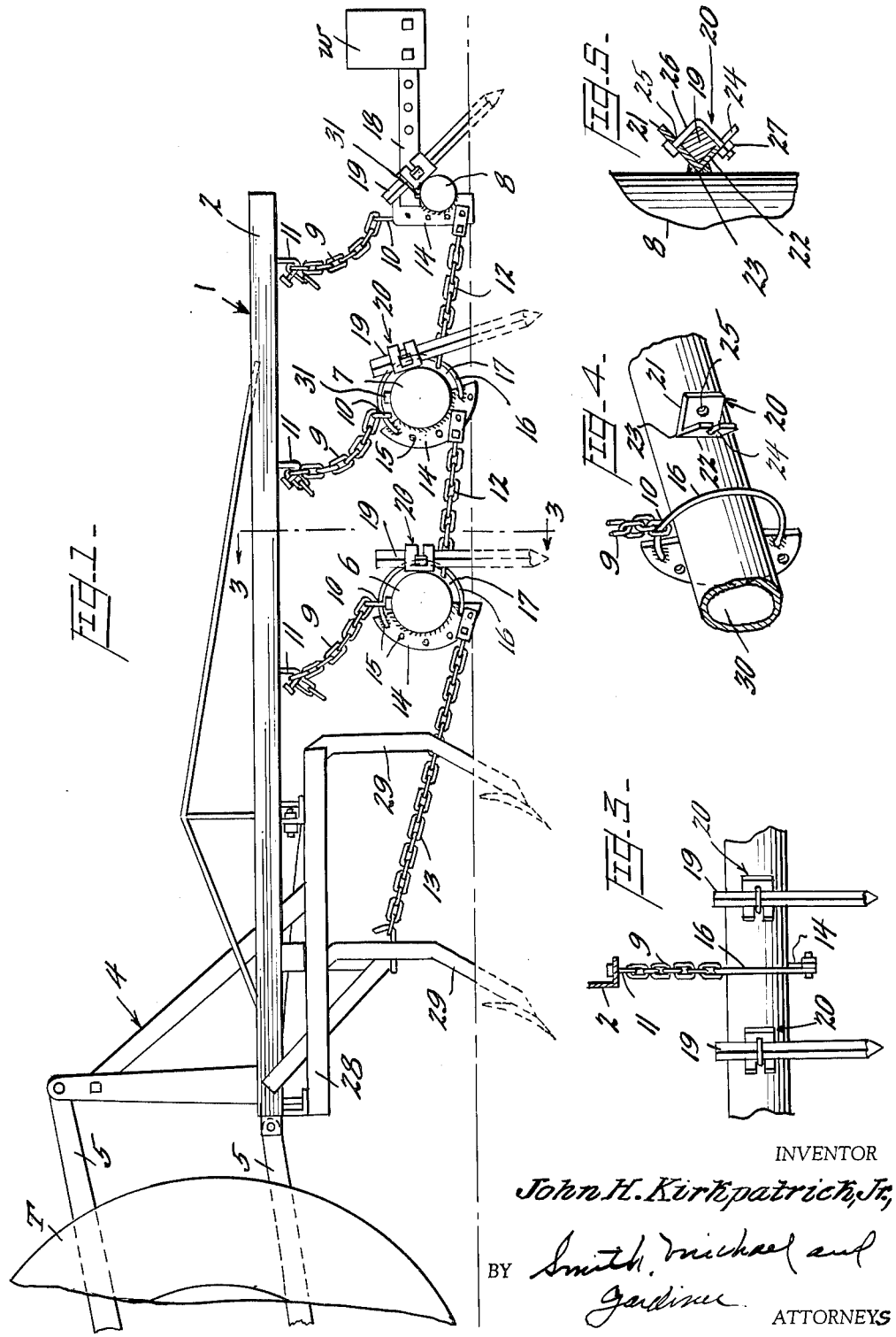

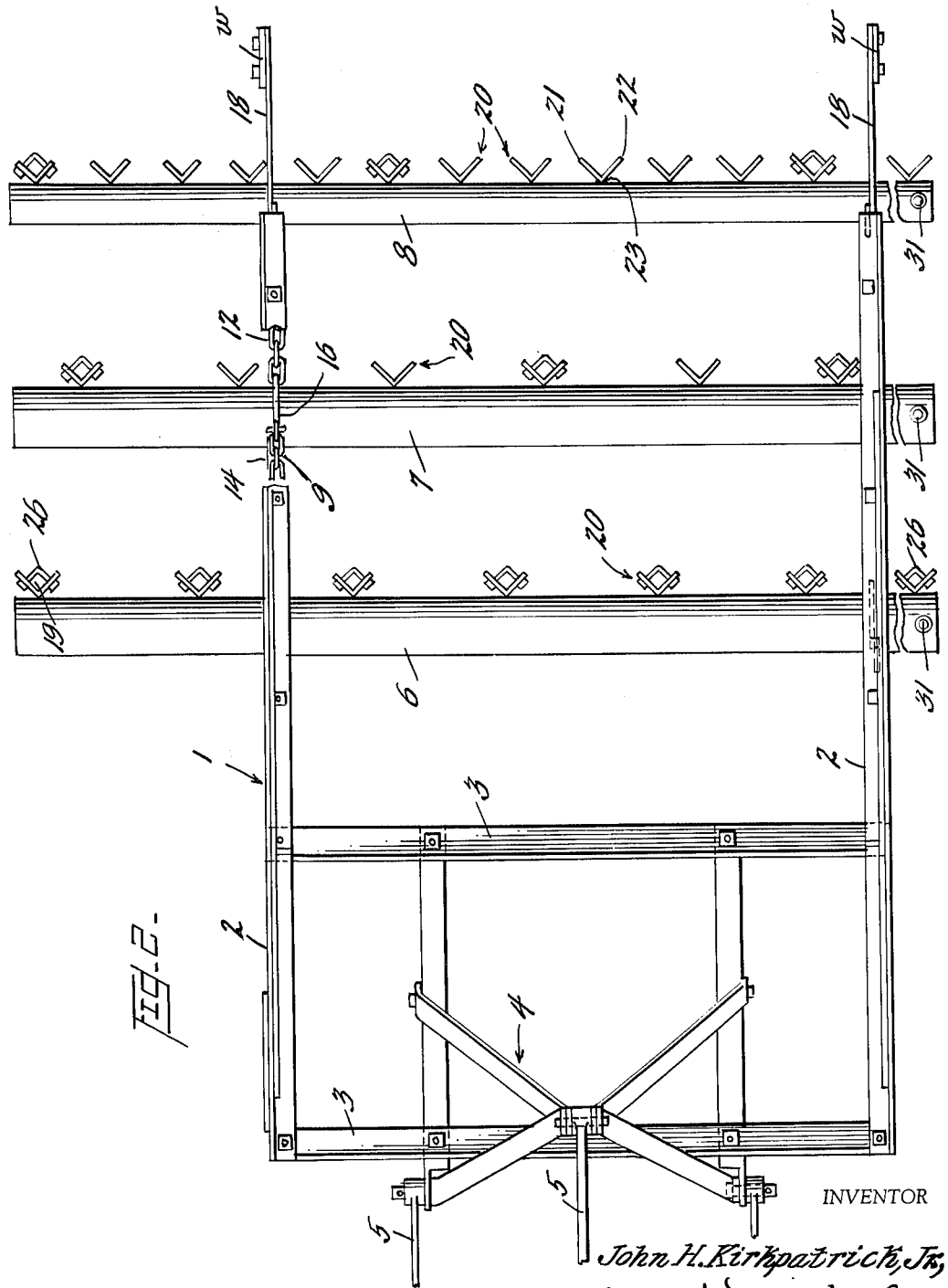

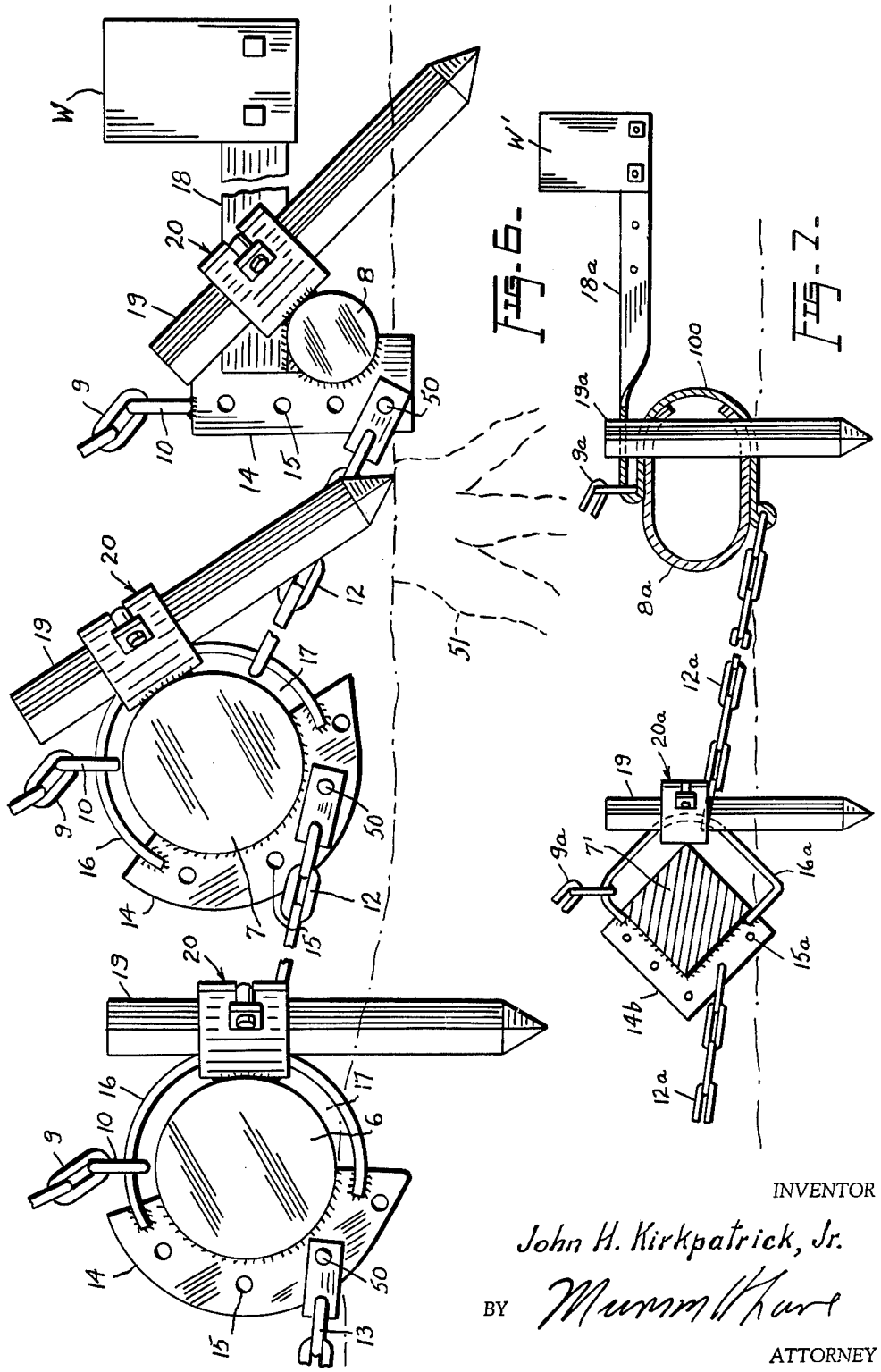

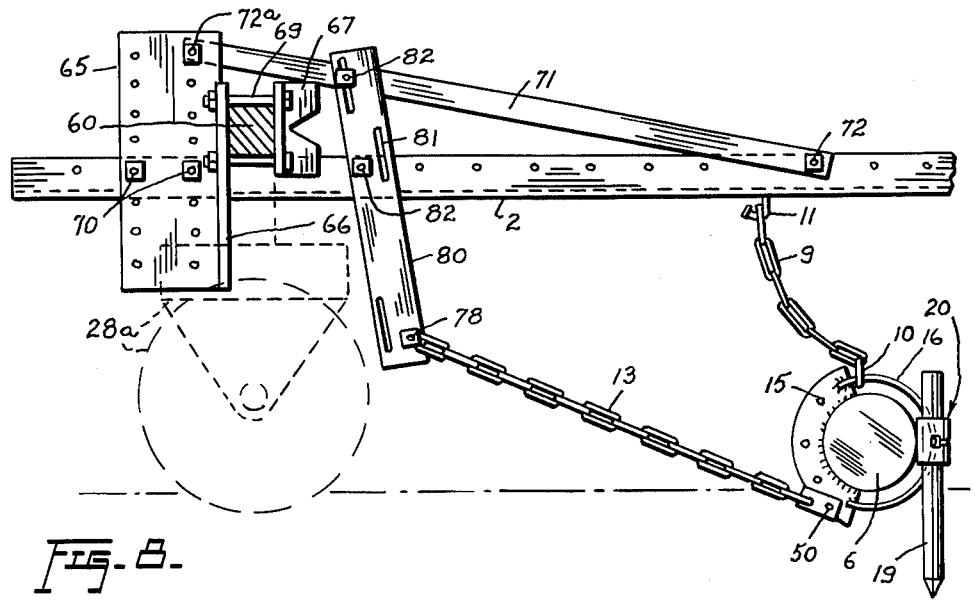

Original Filed Aug. 5, 1963  5 Sheets-Sheet 5

INVENTOR
John H. Kirkpatrick, Jr.
BY
ATTORNEY

United States Patent Office 3,255,831
Patented June 14, 1966

3,255,831
HARROWS
John H. Kirkpatrick, Jr., Mulbrook Farm, Rte. 3, Clyde, N.C.
Continuation of application Ser. No. 301,932, Aug. 5, 1963, which is a continuation of application Ser. No. 79,868, Dec. 30, 1960. This application June 17, 1964, Ser. No. 376,311
22 Claims. (Cl. 172—611)

The present application is a continuation of my application Serial No. 301,932, filed August 5, 1963 which is a continuation of my application Serial No. 79,868, filed December 30, 1960, which in turn is a continuation-in-part of my earlier application Serial No. 18,435, filed March 29, 1960, all now abandoned.

This invention relates to new and useful improvements in agricultural implements, and more particularly to an implement of a toothed harrow type combining the functions of a drag and harrow and embodying one or more toothed drag bars equipped with soil engaging teeth, which may be used either alone or preferably in conjunction with other cultivating implements which may be of any suitable type.

A distinctive feature of the preferred toothed drag bars of my invention resides in the peculiar mounting of such drag bars with reference to the frame of the implement and with reference to each other where more than one drag bar is employed, such mounting permitting each drag bar to move with a distinctive raising and lowering as well as a rolling and rocking movement, independently of the implement frame and of any other drag bar, when any one of the drag bars encounters a massive obstruction such as a stone, tree root or the like. By reason of this peculiar mounting breakage of the teeth is prevented, jarring of the frame is avoided, and continued operation of the drag bar is effected as soon as the obstruction has been passed over. Such distinctive mounting of the drag bars also facilitates self-cleaning of the drag bar teeth when matted grass, roots or the like are encountered. In accordance with my invention each drag bar, while independently movable with reference to the frame and with reference to any other drag bar, as above described, is provided with means yieldingly biasing or urging the drag bar teeth into the soil so that as soon as a massive obstacle has been passed over as above described, the teeth are again brought into operative, soil engaging position by said biasing means.

One of the objects of the invention is to provide an agricultural implement which is capable of performing the combined functions of initially breaking the soil after the manner of a plow, and thereafter performing the additional functions of crushing the clods and leveling the ground after the manner of a drag or the like, pulverizing the soil after the manner of a harrow, and finally raking the soil after the manner of a rake or the like. If desired other agricultural implements or tools, such as seeders, fertilizer distributors, or the like, may be included in the combined implement as by attaching the same at the rear of the raking device or at any other suitable location. It is preferred that the seeding process follow immediately after the seed bed preparation to take advantage of the moisture in the soil to insure quick germination, and this may be accomplished, as indicated above, by attaching the fertilizer distributor and/or seeder immediately in the rear of the cultivating tools. By this means the loss of moisture is avoided and proper germination insured.

Another object of the invention is to provide an implement of this type wherein one or more tooth-equipped drag bars are movably connected to a frame and to one another if two or more bars are provided.

Another object is to provide an implement of the harrow type wherein a tooth-equipped drag bar is equipped with suitable biasing means for yieldably maintaining the teeth thereof in engagement with the soil while permitting the teeth to clear obstructions such as rocks, tree stumps, and the like, the movable drag connection to the drag bar being such as to facilitate clearance of such obstructions by means of each individual drag bar independently of the frame and without the necessity of lifting the whole implement off the ground.

Another object is to provide a harrow type implement wherein a plurality of tooth-equipped drag bars, movably connected together in tandem, may individually and successively clear any obstruction as the implement passes over the same the clearing movement of each drag bar being effected without disturbing the engagement of teeth on the other drag bars in the set with the soil.

Another object is to provide an implement of this type wherein the movable connection between several drag bars in the set is such that the angular relation of the teeth on each drag bar to the ground may be adjusted, individually for each bar, without affecting the others.

Another object is to provide an implement of this type wherein the several toothed drag bars in the set are also connected to an implement frame by suitable flexible connecting means to permit raising and lowering thereof by a conventional tractor lift mechanism, such connection being adjustable so that the sequence of engagement and disengagement of the teeth of the various bars with the soil may be varied as desired.

Another object of the invention is to provide an implement of this type wherein the drag bars are hollow and adapted to receive liquid ballasting material to vary their effective weight.

Another object of the invention is to provide an implement of this type which has a frame particularly adapted for connection to and supporting engagement with one or more additional earth working implements preferably disposed forwardly of the leading drag bar, the invention providing novel bracket means to make such connection possible. Such additional implements may be of any suitable type, as for example, disc cultivators, plow-like implements or other harrows.

Another advantage of the invention resides in its simple construction, efficient and dependable operation, and in its adaptability to economical manufacture.

With the foregoing objects and features in view, and such other objects and features as may become apparent as this specification proceeds, the invention will be understood from the following description taken in conjunction with the accompanying drawings, wherein like characters of reference are used to designate like parts, and wherein:

FIG. 1 is a side elevational view of one form of implement embodying the invention;

FIG. 2 is a top plan view thereof;

FIG. 3 is a fragmentary vertical sectional view, taken substantially in the plane of the line 3—3 in FIG. 1;

FIG. 4 is a fragmentary perspective view of one of the drag bars;

FIG. 5 is a fragmentary detail showing one means for the mounting of one of the drag bar teeth;

FIG. 6 is an enlarged side elevational view showing a set of drag bars with the teeth of one of them clearing an obstruction, the parts being shown in slightly different relative positions than in FIG. 1;

FIG. 7 is a view somewhat similar to FIG. 6 but showing a modified construction, parts being broken away;

FIG. 8 is a fragmentary side elevational view showing a modified embodiment of the implement frame and its connection to a frame member of a leading auxiliary implement;

FIG. 14 is a fragmentary side elevational view showing a modified arrangement of the counterweighted drag bar and FIG. 15 is a sectional detail taken substantially in the plane of the line 15—15 in FIG. 14.

Figure 9:
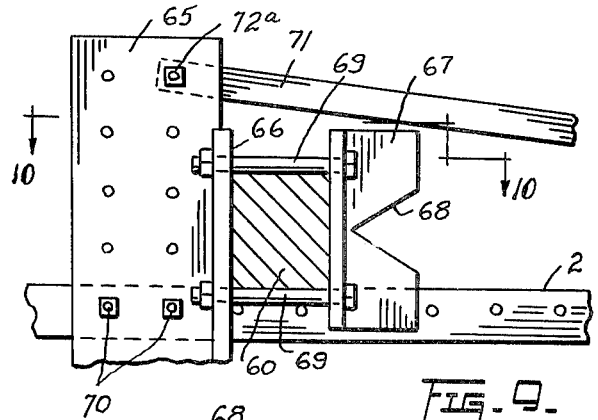
FIG. 9 is a fragmentary side elevational view on an enlarged scale showing the arrangement of bracket means for connecting the implement frame of FIG. 8 to a frame member of the leading, auxiliary implement.

Referring now to the accompanying drawings in detail, more particularly to FIGS. 1–6, showing one form of the device, an agricultural implement embodying my invention is shown which comprises an overhead main frame 1, which frame may be supported for raising and lowering movement by the conventional three-point lift mechanism 5 of a suitable tractor T, or which may be supportably mounted, as hereinafter described, on a supplemental or lead implement 28 of the soil breaking type carried by the lift mechanism 5. In either event, suitable means 4 are provided for attaching the frame 1, or the implement 28 as the case may be, to the lift mechanism 5, as will be readily apparent.

The supplemental or lead implement 28 is provided with suitable earth working tools 29 which may be of any conventional type, but are shown as of the shovel plow type, and the toothed drag bar implement embodying my invention is drawn by the frame 1 rearwardly of the tools 29.

In the construction shown in FIGS. 1–6 the toothed drag bars 6, 7 and 8 are shown as of hollow cylindrical construction, this construction being found suitable for various purposes, since it permits regulation of the weight of the drag bars, but the invention is obviously not limited to the use of drag bars of any particular form or construction, other forms being shown, for example, in FIG. 7, and still others, such as oval bars, either hollow or solid, or flat bars, either hollow or solid, being capable of substitution for the hollow cylinders of the preferred embodiment, as will be apparent to those skilled in the art, it being understood that the function of such drag bars is two-fold, namely to crush and level the ground, and secondly to provide a support for the harrow teeth.

The main frame 1 includes longitudinal side members 2 connected together at their front end portions by transverse members 3. A set of toothed drag bars herein shown as three in number 6, 7 and 8 are shown disposed in tandem below the frame and are movably connected together and to the frame, by suitable flexible connecting means 12 and 13, as will be hereinafter described. Any desired number of such drag bars may be employed. The toothed drag bars preferably project laterally beyond the main frame side members 2 in order that the teeth 19 carried by the drag bars may work the soil traversed by the wheels of the tractor T as well as the soil between the wheel tracks.

As shown, each of the drag bars 6, 7 and 8 has secured thereto at its leading portion transversely spaced arcuate wing plates 14, these being disposed at the front or leading portions of the drag bars and provided with sets of apertures 15 located both above and below the longitudinal axes of the respective bars. The leading drag bar 6 is movably connected to the main frame 1 by flexible draft means in the form of lengths of chain 13, the front ends of which are suitably attached to the frame 1 while their rear ends are adjustably connected to the wing plates 14 on the bar 6 by means of pins 50 (FIG. 6) selectively received in the apertures 15 of these plates.

Each of the drag bars is freely movable independent of the frame and of each other and subject to an up and down as well as a generally rotary or oscillating movement about a longitudinal axis.

The arcuate wing plates 14 on the drag bars 6 and 7 have secured thereto lost motion connection means, herein shown as curved guide rod members 16 which extend around the rear portions of the bars in spaced relation therefrom as indicated at 17. The second drag bar 7 is movably connected to the leading bar 6 by flexible draft and biasing means in the form of the chains 12, the front ends of which are slidably connected to the curved guide members 16 on the trailing portion of the toothed drag bar 6, while their rear ends are adjustably connected to the wing plates 14 on the leading portion of the drag bar 7. The trailing or raking drag bar 8 is movably connected to the intermediate bar 7 by the chains 12 which are slidably connected at their front ends to the lost motion connection means 16 on the bar 7 and adjustably connected at their rear ends to the wing plates 14 on the drag bar 8.

To facilitate raising of the toothed drag bars 6, 7 and 8 off the ground by the tractor lift mechanism 5, lengths of lift chain 9 are provided, these having eyes 10 at one end which are slidable on the curved guide members 16 of the bars 6 and 7, while in the instance of the bar 8 the eyes 10 of the chains 9 are suitably secured to the upper ends of the arcuate wing plates 14 on that bar. The lifting chains 9 are adjustably connected to hooks 11 provided at the underside of the frame members 2, so that when the implement is to be transported without the teeth 19 engaging the soil, the drag bars 6, 7 and 8 may be raised off the ground by the frame 1 upon actuation of the lift mechanism 5. It will be apparent that the effective length of the lifting chains 9 may be adjusted by their connection to the hooks 11 on frame 1, so as to control the sequence in which the drag bars are raised from and lowered to the ground. Similarly, if in operation the frame 1 is not parallel to the ground, adjustment of the lifting chains 9 will assure that any one or more of the drag bars is in contact with the ground until the other bars have moved out of ground contact, thus enabling the operator of the tractor to provide for final working of the soil by any selected drag bar when he raises the frame 1 at the end of a traverse across the field.

While in the embodiment of FIGS. 1 to 6 the guide members 16 to which the trailing draft members or chains 12 are so attached as to provide a lost motion connection therefore so as to permit each of the drag bars to move independently of one another, are shown as arcuate in form and coaxial with the cylindrical drag bars to which they are attached, it is not necessary that they be of this particular form, the important feature of such guide members being that they serve to provide a lost motion connection for the draft means 12 connected to a trailing drag bar 7 or 8. These guide members or ring members 16 also permit lost motion of the chains 9 which are connected at their upper ends to the side members 2 of the left frame 1.

As shown, the teeth 19 are adjustably mounted in V-shaped tooth brackets 20 secured at spaced points to the rear or trailing portions of the drag bars 6, 7 and 8. Such mounting of the teeth at the rear of the drag bar and away from the axial center of the drag bar provides added leverage for the rolling and rocking movement which takes place when a tooth or teeth contact an obstruction as illustrated in FIG. 6, and tends to reduce the breakage of the teeth, the jar on the implement frame, as well as to facilitate the self-cleaning action of the teeth when matted roots, grasses or the like are encountered, as previously set forth.

As is best shown in FIGS. 4 and 5, each tooth bracket 20 includes side members 21, 22 joined at the apex 23, at which point the bracket is secured to the trailing portion of the associated drag bar. One side member, such as the member 22, is provided with an open slot 24 and the other side member 21 is provided with an aperture 25. The tooth 19 is adjustably secured in the bracket by a bent, headed bolt 26 which extends through the aperture 25 and slot 24, so that when a nut 27 is applied to the bolt the latter embraces and clamps the tooth 19 in place. The teeth on the several drag bars may be adjusted vertically in the brackets 20 in order that different lengths of the teeth may extend below the drag bars for greater or less penetration of the soil over which the implement is drawn.

The trailing or raking drag bar 8 is shown as provided at the top thereof with rearwardly extending arms 18 having counterweights W provided thereon whereby to additionally yieldably urge or bias the teeth 19 of the bar 8 into the soil.

It will be apparent that by selectively positioning the pins 50 of the chains 12, 13 in the apertures 15 of the wing plates 14, the angular relationship of the teeth 19 to the ground may be varied as exemplified in FIGS. 1 and 6, to obtain the maximum crushing action of the drag bars and the cutting action of the teeth carried thereby, the particular adjustment in a given instance being dependent on various factors such as the type of soil and the type of surface covering, if any, for such soil, as for example, grass matted roots, or the like.

When the implement is in operation the flexible draft means afforded by the chains 12, 13 will permit the drag bars 6, 7 and 8 to move with a floating and rolling or rocking movement in response to varying resistance encountered by the teeth 19 in the soil, such movement being possible for any one bar without affecting the others and independent of the frame 1. Such movement is illustrated in FIG. 6, wherein it will be noted that the teeth 19 of the drag bar 7 have encountered a massive resistance, as for example, a tree stump 51, causing the teeth to be raised sufficiently to clear the obstruction. The flexible chain 12 extending from the bar 7 to the bar 6 permits the drag bar 6 to be unaffected by the movement of the drag bar 7, and similarly, the sliding connection of the chain 12 on the lost motion connection means 16 of the drag bar 7 prevents the movement of the drag bar 7 to be transmitted to the raking drag bar 8. It will be also noted that during the movement of the bar 7 the eye 10 of the associated lifting chain 9 also slides on the lost motion connection means 16 without interfering with the bar movement.

It will be noted that the floating and rolling or rocking movement of each individual drag bar, on encountering an obstruction as described above, combines rotation of the bar about a longitudinal axis parallel to the bar, with an upward floating movement of the bar as a whole due to the flexible chain connection 12 or 13.

The teeth 19 on the various drag bars 6, 7, 8 will individually, independently and successively clear the obstruction 51 as the implement passes over it, and after the raking drag bar 8 has cleared the obstruction the counterweights W thereon will cause the teeth of that bar to again penetrate the soil. It is to be noted that while the movement of the bar 7 as depicted in FIG. 6 has been described in conjunction with the obstruction 51, a certain amount of such movement takes place even in the absence of a massive obstruction by virtue of varying resistances offered by the soil to the working action of the teeth 19 when the implement is drawn forwardly.

The toothed drag bars 6, 7 and 8 are preferably hollow as indicated at 30 and provided with a filling aperture and closure plug 31 whereby the bars may be filled, either partially or totally, with water or other liquid to serve as a ballast or biasing means, if so desired, and the liquid may be removed to facilitate lifting of the bars in transit. While three of the bars (6, 7 and 8) have been shown, they may be used singly by employing the counterweighted bar 8 alone, or any suitable number of bars may be connected together in tandem. Moreover, while the bars have been shown as cylindrical, they may be of any desired cross-section and the wing plates 14 may be of any suitable shape while still providing for selective positioning of the fulcrum pins 50 in the apertures 15.

It will be further noted that while in the case of the trailing drag bar 8 a counterweight is employed as an additional means urging or biasing the drag bar teeth into the soil, such biasing effect is accomplished in the case of the two leading drag bars without the aid of a counterweight, this being accomplished solely by the weight of the toothed drag bars supplemented by the draft connections 12 and 13. These forces are also effective in the case of the rear drag bar, the counterweight W serving in this instance as additional biasing means. In each instance, however, the drag bar is freely movable upwardly, downwardly and with a rolling or rocking movement independently of the implement frame and also independently of any other drag bar, this being a distinctive feature of my invention.

In FIG. 7 there is shown a modification wherein different forms of drag bars are employed in place of the hollow cylindrical drag bars of FIGS. 1–6. In this figure only the last toothed drag bar 7' is shown together with a weight-biased raking drag $8^a$, it being understood that one or more additional toothed drag bars may be employed in advance of the drag bar 7'. As shown the drag bar 7' is of diamond shape in cross section and is provided with one or more collars $14^b$ having apertures $13^a$ therein for selective attachment of chains $12^a$, and having lost motion connection means $16^a$ corresponding to members 16 of the previously described embodiment for attachment of the chains $12^a$ connecting the toothed drag bar 7' to the raking drag bar $8^a$ at the rear thereof. Lifting chains $9^a$ are also attached to the members $16^a$ as in the previously described embodiment of the invention. Raking teeth 19 are carried by brackets $20^a$ connected to the drag bar 7'.

The trailing raking drag bar is shown in cross section as comprising a flexible member $8^a$ having apertures therein adapted to tightly grip the raking teeth $19^a$ when inserted therein.

Brackets 100 are secured to the raking drag bar $18^a$ at suitable intervals as by welding or the like, and provide extension arms $18^a$ carrying weights W'.

Figure 10:
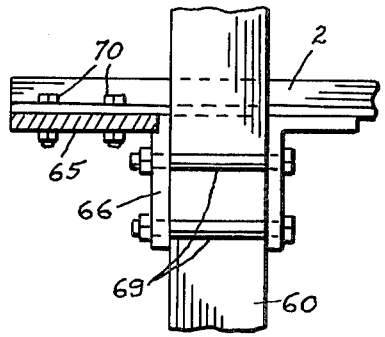
FIG. 10 is a fragmentary horizontal sectional view, taken substantially in the plane of the line 10—10 in FIG. 9.

FIGS. 8–13 illustrate various arrangements of bracket means whereby the implement frame side members 2 may be connected to the frame of an auxiliary implement $28^a$, such as a disc harrow, for example. These bracket means are of a universal nature and adapted to fit, for example, an auxiliary implement frame member 60 of a rectangular cross-section as shown in FIGS. 8–10, or a member 61 of an L-shaped cross-section as in FIG. 11, or a member 62 of a diamond cross-section as in FIG. 12, or a tubular frame member 63 as in FIG. 13.

As shown in FIGS. 8–13 the bracket means comprises a perforated plate 65 provided at one edge thereof with a right-angular flange 66, and a right-angle bracket 67 formed in one side thereof with a V-shaped notch 68. A pair of clamping bolts 69 extend through the other side of the bracket 67 and through the flange 66 of the plate 65, whereby to clamp the frame member 60 of the auxiliary implement therebetween, as shown in FIGS. 8–10. The plate 65 is secured by suitable bolts 70 to the frame member 2 and a brace 71 may extend from the frame member 2 to the plate 65, being attached to the former by a bolt 72 and to the latter by a bolt $72^a$.

Figure 11:
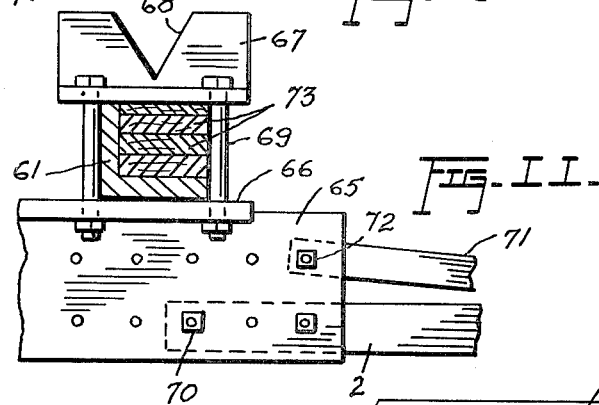
FIG. 11 is a fragmentary view similar to that shown in FIG. 8 but illustrating another arrangement of the bracket means.

In FIG. 11 the L-shaped frame member 61 is similarly clamped between the bracket 67 and the flange 66 by the bolts 69, but spacers of wood or other compressible material are provided in the frame member, as indicated at 73.

Figure 12:
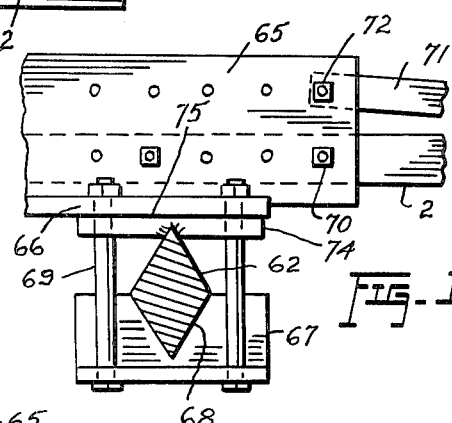
FIG. 12 is a fragmentary view showing another arrangement of the bracket means.

In FIG. 12 the position of the bracket 67 is reversed so that the diamond-shaped cross-section of the frame member 62 fits in the notch 68. A complemental block 74 is welded or otherwise secured to the member 62 opposite to the bracket 67 and has a flat face 75 to engage the flange 66 of the plate 65.

Figure 13:
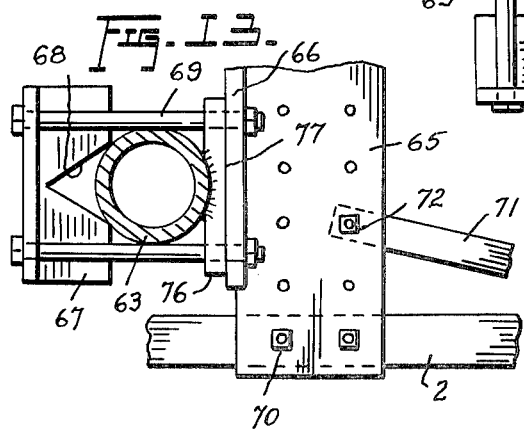
FIG. 13 is a fragmentary view showing still another arrangement of the bracket means.

In FIG. 13 the tubular frame member 63 is accommodated in the notch 68 of the bracket 67 at one side and is provided at the relatively opposite side with a complemental block 76 having a flat face 77 to engage the flange 66.

In all instances the flanged plate 65 and the notched bracket 67 are utilized universally in a manner which permits the frame member 2 to be either above or below the frame member of the auxiliary implement, with the plate 65 disposed above, below, forwardly or rearwardly of the auxiliary implement frame member, so that the matter of attaching the frame member 2 to the auxiliary implement may in all instances be effected with ease and convenience.

Referring again to FIG. 8, it will be noted that in the arrangement illustrated the draft chain 13 of the leading drag bar 6 is connected at its front end by a bolt 78 to the lower end of a strap 80, the latter being provided with suitable apertures and slots 81 to receive bolts 82 whereby the strap 80 may be adjustably secured to the frame side member 2 and to the brace 71. If preferred, the strap 80 may be secured in various selected positions to the plate 65, as will be readily apparent.

FIGS. 14 and 15 illustrate a modified arrangement of the counterweighted raking drag bar 8 which, instead of being connected by the draft chains 11 to the drag bar 7 as in FIGS. 1 and 6, is in this instance provided at the ends thereof with trunnions 84 which are rotatably journalled in bearing blocks 85. The latter are grooved as at 86 and slidable vertically between spaced guides 87, as indicated at 88. The upper end portions of the guides 87 are provided with apertures 89 to receive bolts 90 whereby the guides are adjustably secured to brackets 91 provided at the rear end of the frame members 2.

When this embodiment of the invention is placed in operation the drag bar teeth 19 are biased into the soil not only by the counterweight W acting on the raking drag bar 8, but also by the weight of the drag bar itself, which is urged downwardly by gravity as facilitated by the sliding action of the bearing blocks 85 in the guides 87. As the teeth 19 of the bar encounter various resistances in the soil the bar 8 may turn about the axis of the trunnions 84 under the yieldable bias of the counterweight W, and the drag bar may also rise and fall as indicated at 88.

If desired a suitable draw bar B may be attached at any convenient location, as for example at the rear of the raking drag bar attachment, for the attachment of other agricultural implements, as for example fertilizer spreaders, seeders or the like, not shown.

While in the foregoing there have been described and shown in the preferred embodiments of the invention, various modifications may become apparent to those skilled in the art to which the invention relates. Accordingly, it is not desired to limit the invention to this disclosure and various modifications and equivalents may be resorted to, such as may lie within the spirit and scope of the invention as claimed.

It will be understood that in the accompanying claims the term "biasing" applies not only to the yielding weight-force relationship provided by the counterweights W and W' carried by the trailing or raking drag bars 8 and 8ª, but applies also to the leading toothed drag bars 6, 7 and 7' by reason of their weight and of the adjustable connection provided by the flexible chains 12, 12ª and 13 and the apertured wing plates or collars 14 and 14ᵇ.

I claim:

1. In a harrow, an implement frame adapted to be connected to a draft source, an elongated drag bar, flexible draft means connecting the drag bar to the frame, a pair of wing plates carried by the drag bar at longitudinally spaced points thereof, said wing plates extending outwardly of the bar and transversely of the longitudinal axis thereof and each plate being provided with a vertical series of spaced apertures including apertures disposed above and apertures disposed below a horizontal plane passing through the longitudinal axis of the drag bar, said wing plates being disposed along the leading edge of the drag bar, means for adjustably connecting the draft means to said wing plates respectively in any one of said apertures and a plurality of harrow teeth carried by said drag bar at longitudinally spaced points along the trailing edge thereof and depending therefrom for engagement with the soil and lost motion connecting means comprising guide members connected to said wing plates and spaced from and curved about the bar, a second drag bar mounted in trailing relation to the leading drag bar and draft means between the trailing drag bar and said lost motion device.

2. In a harrow, an implement frame adapted to be connected to a draft source, an elongated transverse drag bar, flexible draft means for connecting the drag bar to the frame, a pair of generally arcuate wing plates carried by the drag bar as longitudinally spaced points thereof, said wing plates extending outwardly of the bar and transversely of the longitudinal axis thereof and each plate being provided with a corresponding series of arcuately spaced apertures including apertures disposed above and apertures disposed below a horizontal plane passing through the longitudinal axis of the drag bar with corresponding apertures in the respective wing plates being substantially aligned in a direction parallel to the longitudinal axis of the bar, said wing plates being disposed along the leading edge of the drag bar, means for adjustably connecting the draft means to said wing plates respectively in any pair of corresponding apertures and a plurality of harrow teeth carried by said drag bar at longitudinally spaced points along the trailing edge thereof and depending therefrom for engagement with the soil and lost motion connection means comprising guide members connected to said wing plates and spaced from and curved about said drag bar, a second drag bar mounted in trailing relation to the leading drag bar and draft means between the trailing drag bar and said lost motion device.

3. A harrow comprising an implement frame member, an elongated transverse drag bar, flexible means for attachment to the drag bar depending from the frame member, means for connecting the frame member to a tractor or the like, flexible draft means for attaching the drag bar to the frame member, a pair of wing plates carried by the drag bar at longitudinally spaced points thereof, said wing plates extending outwardly of the bar and transversely of the longitudinal axis thereof and each plate being provided with a vertical series of spaced apertures including apertures disposed above and apertures disposed below a horizontal plane passing through the longitudinal axis of the drag bar, said wing plates being disposed along the leading edge of the drag bar, means for adjustably connecting the flexible draft means to said wing plates respectively in any one of said apertures and a plurality of harrow teeth carried by said drag bar at longitudinally spaced points along the trailing edge thereof and depending therefrom for engagement with the soil and lost motion connection means comprising guide members connected to said wing plates and spaced from and curved about said drag bar for attachment of said flexible means depending from the frame a second drag bar mounted in trailing relation to the leading drag bar and draft means between the trailing drag bar and said lost motion device.

4. In a toothed harrow type implement, the combination of an implement frame adapted to be connected to a draft source, an elongated transverse drag bar having a leading edge portion and a trailing edge portion, a soil engaging tooth mounted on and extending downwardly from the trailing edge portion of said bar, a forwardly projecting wing plate provided on the leading edge portion of the bar and formed with a set of vertically spaced apertures, a fulcrum element selectively positioned in said apertures, an elongated and flexible draft element connected to said fulcrum element and extending forwardly therefrom for connection to said frame, means for yieldably biasing said tooth into the soil, and lost motion means carried at the trailing edge of said drag bar, spaced therefrom and curved thereabout, a second drag bar mounted in trailing relation to the leading drag bar and draft means between the trailing drag bar and said lost motion device.

5. The device as defined in claim 4 wherein the biasing means of the trailing drag bar includes a counterweight disposed rearwardly of and connected to said trailing drag bar.

6. In a harrow, a plurality of drag bars, means for connecting the drag bars in tandem relation comprising spaced wing plates on the leading edges of the drag bars and extending forwardly therefrom in planes generally transverse to the longitudinal axes of the respective bars, each wing plate having a series of spaced apertures including apertures disposed above and apertures disposed below horizontal planes passing through the longitudinal axes of the respective bars, and lost motion connecting means carried by the drag bars and projecting rearwardly from the trailing edges thereof for connection of draft means to the drag bars trailing therefrom, said lost motion connecting means being disposed in planes transverse to the longitudinal axes of the drag bars and including portions curved about and in spaced relation to said drag bars, draft members adjustably connected to the wing plates of each trailing drag bar, means slidably connecting said draft means to the attached lost motion connection means immediately adjacent leading drag bars, additional draft members for adjustably connecting the wing plates of the leading drag bar to a tractor or the like and harrow teeth carried by the drag bars and spaced along the trailing edges thereof.

7. The harrow described in claim 6 wherein said first and second-mentioned draft means are flexible members and wherein the corresponding apertures in the wing plates of each drag bar are disposed in alignment along lines substantially parallel to the longitudinal axes of the respective drag bars.

8. A drag bar for toothed harrows comprising an elongated bar member having wing plates attached thereto at longitudinally spaced points along the leading edge thereof, said wing plates being disposed in planes generally transverse to the longitudinal axis of the bar, said wing plates each having a series of spaced apertures with corresponding apertures in the plates being aligned along lines generally parallel to the longitudinal axis of the bar, a plurality of harrow teeth secured in longitudinally spaced relation to the trailing edge of the bar and depending therefrom in soil-engaging relation thereto, and a plurality of lost motion connection means secured to the bar in longitudinally spaced relation and extending rearwardly therefrom and including portions in spaced relation to the surface of the bar in generally concentric relation to the longitudinal axis of the bar.

9. The drag bar described in claim 8 wherein the bar member is hollow and provided with a filling aperture to provide for ballasting the bar with liquid when desired.

10. A harrow comprising a frame having means for connecting it to a draft source, a plurality of transverse elongated drag bars connected in tandem, means connecting the leading drag bar in draft relation to a forward point of said frame with the drag bars underlying the frame, flexible means for attachment to the drag bars depending from said frame and means for flexibly interconnecting the drag bars to one another to cause rocking movement of the drag bars about the respective longitudinal axes thereof when in operation, including flexible draft means connecting the trailing edge of a leading drag bar to a leading edge of a trailing drag bar, adjustable connections for varying the height of the point of connection of said flexible draft means to the leading edges of the draft bars with respect to a horizontal plane passing through the longitudinal axis thereof, lost-motion connection means carried by one of said leading draft bars curved thereabout and spaced therefrom for attachment of said flexible means depending from said frame and for connecting said flexible draft means to the trailing edge of the trailing drag bar, and a plurality of harrow teeth carried by the drag bars in longitudinal spaced relation along the trailing edges thereof.

11. The harrow described in claim 9 wherein the rearmost drag bar is provided with a rearwardly extending counter-balancing arm and a counter-balancing weight member adjustably mounted on said arm.

12. The harrow described in claim 10 wherein the frame member includes a portion, adjacent to the connection means, for supporting an auxiliary earth-working implement in depending relation to the frame and forwardly of the foremost drag bar.

13. The harrow described in claim 10 wherein said flexible means depending from said frame are adjustable in length whereby to control the sequence of engagement and of disengagement of the drag bar with the soil when the frame is raised and lowered.

14. A drag bar for harrows comprising an elongated generally cylindrical bar member, spaced wing plates carried by the bar member and disposed to extend forwardly from the leading edge thereof when in use, said wing plates being each provided with a series of spaced apertures, said series of apertures including apertures disposed above and apertures disposed below a horizontal plane passing through a longitudinal axis of the bar, plural lost motion connection members secured to the bar and extending rearwardly therefrom in longitudinal spaced relation, said lost motion connection members being disposed in planes substantially transverse to the longitudinal axis of the drag bar and each being provided with a trailing portion disposed in spaced relation to and curved about the drag bar, a second drag bar mounted in trailing relation to the leading drag bar and draft means between the trailing drag bar and said lost motion device and means carried by each drag bar on the trailing edge thereof to mount a plurality of harrow teeth in longitudinally spaced relation thereon.

15. A drag bar for harrows comprising an elongated bar member, plural draft attaching means carried by the bar at spaced longitudinally aligned points thereon, means for adjustably connecting draft means to each of said draft attaching means at any one of a plurality of points displaced angularly about the axis of said bar, means for mounting a plurality of harrow teeth on said bar at spaced longitudinally aligned points, said draft attaching means and said harrow teeth mounting means being disposed on opposite sides of the longitudinal axis of said drag bar, and lost motion connection means carried at the trailing portion of said drag bar curved thereabout and spaced therefrom, a second drag bar mounted in trailing relation to the leading drag bar and draft means between the trailing drag bar and said lost motion device.

16. The drag bar described in claim 15 wherein the draft attaching means comprises a wing plate secured to the bar and provided with a plurality of apertures angularly spaced about the axis of the bar.

17. The drag bar described in claim 15 wherein said bar is hollow and is provided with a filling aperture and closure plug whereby said bar may be ballasted with liquid.

18. A drag bar for harrows comprising an elongated bar member, plural draft attaching means carried by the bar at spaced longitudinally aligned points thereon, means for adjustably connecting draft means to each of said draft attaching means at any one of a plurality of points displaced angularly about the axis of said bar, means for mounting a plurality of harrow teeth on said bar at spaced longitudinally aligned points, said draft attaching means and said harrow teeth mounting means being disposed on opposite sides of the longitudinal axis of said drag bar, said bar being provided with additional draft attaching means disposed on the same side of the longitudinal axis of the bar as are the harrow teeth with reference to the mounting means, said additional draft attaching means including lost motion connections extending in spaced relation to the bar and substantially arcuately about the longitudinal axis thereof.

19. In a toothed harrow type implement, the combination of a drawn frame elevated from the ground, a plurality of transverse drag bars disposed in tandem below the level of said frame and each having a leading edge portion and a trailing edge portion, soil engaging teeth mounted on and extending downwardly from the trailing edge portions of said drag bars, forwardly projecting wing plates provided on the leading edge portions of the bars and formed with sets of vertically spaced apertures, fulcrum elements selectively positioned in the apertures of said wing plates, elongated flexible draft elements connected at one end thereof to said frame and extending rearwardly therefrom, the other end of said draft elements being connected to the fulcrum elements on the wing plates of the leading draft bar in the set, lost motion connection means carried by and curved about the trailing portions of each of the drag bars except the last for attachment of drag means for the trailing bar, said last named draft means comprising elongated and flexible draft elements movably connected at one end to the said lost motion connecting means at the trailing edge portion of all but the trailing one of said bars, said draft elements being connected at their other ends to the fulcrum elements on the wing plates of the succeeding bars, and a counterweight disposed rearwardly of and connected to the trailing one of said bars, and flexible means depending from said frame and attached to all but the rearmost of said drag bars by means of said lost motion means, said drag bars being freely movable up and down independently of said implement frame and each of the drag bars being rotatable independently of the others.

20. The device as defined in claim 19 wherein said lost motion means comprises curved rod members provided on the trailing edge portions of all but the trailing one of said bars, said additional draft elements being slidably connected at said one end thereof to said curved rod members.

21. A harrow comprising an overhead frame, a plurality of in-tandem-relation drag bars, flexible draft means for the drag bars, a plurality of harrow teeth fixed adjustably at intervals to the trailing edge of each drag bar and depending therefrom for engagement with the soil, and lost motion connection means carried by and curved about each lead draft bar for attachment of the draft means of the trailing bar whereby each of the drag bars is rotatable about a longitudinal axis and operates independently of the others.

22. In a toothed harrow type implement, the combination of a draft source, a clod crushing drag bar normally engaging the ground and supported thereby and extending transversely of the direction of movement of the implement, soil penetrating teeth carried by the drag bar, a draft element flexibly connected at one end thereof to the draft source and connected at the other end to the leading edge of said drag bar, said drag bar being at all times freely movable up and down independently of the draft source and freely rotatable about a longitudinal axis, and lost motion connection means extending in substantially uniformly spaced relation to said drag bar for attachment of said draft means for a trailing drag bar.

References Cited by the Examiner

UNITED STATES PATENTS

| | | | |
|---|---|---|---|
| 222,864 | 12/1879 | Campbell | 172—620 |
| 409,391 | 8/1889 | Casey | 172—150 |
| 675,428 | 6/1901 | Voorhees | 172—625 |
| 2,574,468 | 11/1951 | Denton | 172—611 XR |
| 2,629,217 | 2/1953 | Kuehn et al. | 172—621 XR |
| 2,674,836 | 4/1954 | Schulte | 172—713 XR |

FOREIGN PATENTS

| | | |
|---|---|---|
| 187,331 | 10/1956 | Austria. |
| 660,962 | 11/1951 | Great Britain. |

ABRAHAM G. STONE, *Primary Examiner.*

T. GRAHAM CRAVER, *Examiner.*

JIMMIE R. OAKS, *Assistant Examiner.*